United States Patent [19]

Rehrig

[11] Patent Number: 4,922,639
[45] Date of Patent: May 8, 1990

[54] CART WITH ADVERTISING PANELS
[75] Inventor: Houston Rehrig, Pasadena, Calif.
[73] Assignee: Rehrig International, Inc., Richmond, Va.
[21] Appl. No.: 190,065
[22] Filed: May 4, 1988
[51] Int. Cl.⁵ ............................................. G09F 3/00
[52] U.S. Cl. ...................................... 40/308; 40/642; 280/33.991
[58] Field of Search ................ 40/308, 591, 643, 642; 280/33.99

[56] References Cited

U.S. PATENT DOCUMENTS

| | | | |
|---|---|---|---|
| 2,723,474 | 11/1955 | Minter | 40/308 |
| 2,797,513 | 7/1957 | Edwards | 40/643 |
| 2,845,729 | 8/1958 | Baumgart | 40/10 |
| 3,024,554 | 3/1962 | Kemper | 40/308 |
| 3,088,236 | 5/1963 | Hendrick | 40/308 |
| 3,287,841 | 11/1966 | Spragg et al. | 40/308 |
| 3,609,893 | 10/1971 | Routzahn | 40/308 |
| 3,677,570 | 7/1972 | Hedu | 40/308 |
| 3,782,747 | 1/1974 | Hamilton, Jr. | 280/33.99 |
| 3,999,774 | 12/1976 | Rehrig | 280/33.99 |
| 4,024,660 | 5/1977 | Goto | 40/308 |
| 4,217,711 | 8/1980 | Spresser et al. | 40/308 |
| 4,273,346 | 6/1981 | Rehrig | 280/33.99 |
| 4,650,199 | 3/1987 | Rehrig | 280/33.99 |

FOREIGN PATENT DOCUMENTS

| | | |
|---|---|---|
| 3133276 | 3/1983 | Fed. Rep. of Germany . |
| 3502791 | 7/1986 | Fed. Rep. of Germany . |
| 2452142 | 10/1980 | France . |

Primary Examiner—Gene Mancene
Assistant Examiner—Wenceslao J. Contreras
Attorney, Agent, or Firm—Banner, Birch, McKie & Beckett

[57] ABSTRACT

Molded-in advertising panels which may be integrally formed with any of the walls of a plastic shopping cart basket. The molded-in advertising panel includes a plate portion, molded with and recessed from the outer surface of the walls of the plastic basket, and a frame element. The frame element for the molded-in panel is preferably identical to that for the retrofitted panel embodiment and is also retained in position using tabs and slots.

48 Claims, 14 Drawing Sheets

FIG. 19.
FIG. 21.
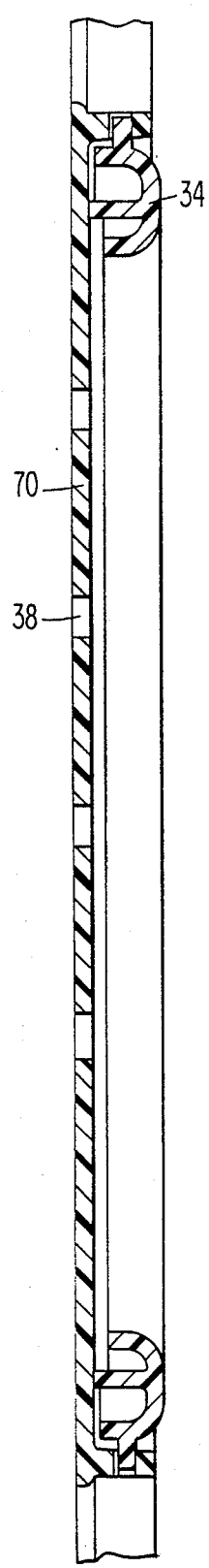
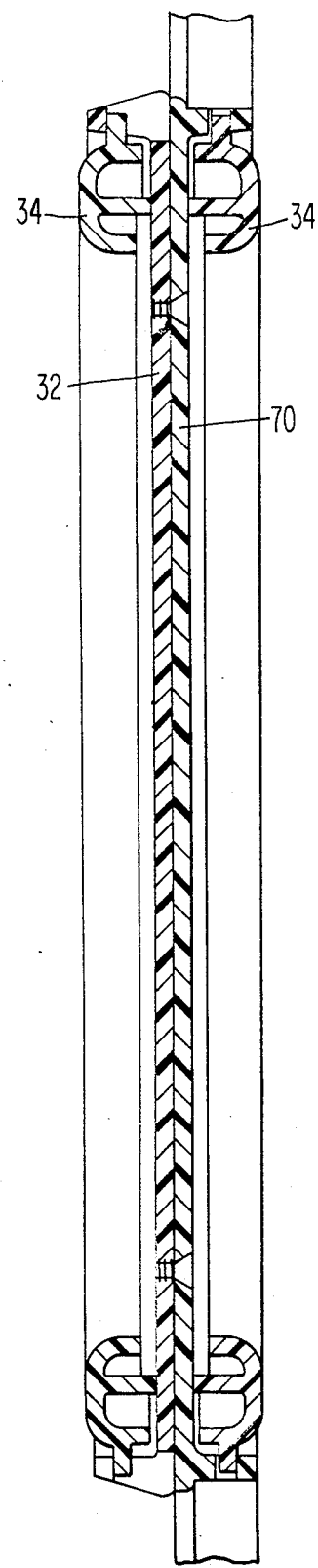

CART WITH ADVERTISING PANELS

TECHNICAL FIELD

The present invention relates to carts used in supermarkets and other retail stores. More particularly, the present invention is directed to carts having advertising panels molded therein.

BACKGROUND OF THE INVENTION

Carts having a frame and a basket used in supermarkets are commonplace. The shopping cart has a metal cart frame on which wheels are mounted. A basket is mounted on the cart frame and includes two side walls, a front wall, a back wall, and a bottom portion. The basket may be made from wires welded together to form a gridlike construction. Alternatively, the basket may be molded from plastic. The carts may be formed in various configurations including the standard configuration (see U.S. Pat. No. 3,999,774), jumbo or mini-carts, over-the-counter carts (see U.S. Pat. No. 4,273,346), and scanner carts (see U.S. Pat. No. 4,650,199). These patents are all directed to carts having plastic baskets. Regardless of the type of cart and whether the basket is made from plastic or wire, the basket is formed almost entirely of an open latticework construction.

The practice of fastening framed advertising panels to shopping carts is becoming widespread. Advertising panels are typically fastened to the outside and inside of the front wall of the shopping cart basket. These panels are used with either wire or plastic baskets. It has been shown that advertisements placed on panels on shopping carts are as much as ten times more effective than television advertising. The advertising panels eliminate the need for third party advertising services and increase the in-store advertising revenue. The advertising panels also allow easy handling of the advertisement. With existing carts, only retrofitted framed advertising panels may be disposed on the carts. Also, panels may be disposed only on the front walls of the cart baskets because panels disposed on the side walls would prevent nesting of carts and would be damaged when attempting to nest carts together.

One known method of retrofitting advertising panels onto shopping cart baskets is produced by Actmedia Inc. In the Actmedia apparatus two separate advertising panels are mounted on either side of the front wall of the basket. The panels are attached to each other through the latticework of the front basket wall placing screws through holes in both advertising panels. Each advertising panel is formed of one piece of plastic and includes two elements: a plate and a frame. The plate is rectangular and serves as the backing for the advertisement. The frame is also rectangular and is hingedly formed on the plate. The frame has tabs disposed on its top and side members which fit behind ridges disposed on the top and side peripheral walls of the plate. When the frame is snapped into the plate, the front surfaces of the frame are substantially flush with the protruding edges of the peripheral top, right, and left walls of the plate.

However, this apparatus has many disadvantages. First, the frame must be hinged away from the plate to insert and remove advertisements. Additionally, the plastic hinges connecting the frame to the plate often deteriorate and break within a short time. This requires the replacement of the entire advertising panel. Because the frames are integrally formed as one piece with the plates, when the hinge or other components break, the entire panel must be replaced. Moreover, these advertising panels are formed with solid plates by injection molding plastic. As the plates cool, the plastic shrinks, causing the plate to warp. This occurs because the inner portion of the plate cools at a slower rate than the outer portion. Because high density polyethelene shrinks at least 0.20" per inch during cooling, a typical advertising panel would be 3/16 inch smaller after cooling. Slower cooling causes greater shrinkage. However, more rapid cooling on one side of the panel than on the other side causes stresses which further result in an inwardly concaving surface. The advertisement is less securely held within the panel when abutting a curved surface rather than a flat surface. This also detracts from the effectiveness of the advertisement as the concavity causes the advertisement to bow or reflect light and thereby be less readable.

SUMMARY OF THE INVENTION

The primary purposes of the present invention are two-fold. In one embodiment of the present invention, an improved advertising panel for retrofitting on existing cart baskets is disclosed. In another embodiment, advertising panels that are molded-in to plastic cart baskets are disclosed. The molded-in panels overcome many of the disadvantages of retrofitted advertising panels.

It is an object of the present invention to provide inexpensive, low maintenance advertising panels that use no hinges and no moving parts, and that may be retrofitted on existing cart baskets.

It is another object of the present invention to provide retrofitted advertising panels having holes strategically placed in the plate element to prevent warping and stress distortion during the molding process, to allow easier placement and a flatter display without excess reflection or bowing of the advertisement, and which is easy to clean and maintain.

It is a further object of the present invention to provide a molded-in advertising frame on a cart having a plastic basket and that may be formed on the side walls of the basket without affecting the ability of the carts to nest.

It is object of the present invention to provide a molded-in advertising panel that is durable, and does not have any protrusions to catch on merchandise, fixtures, or customers.

It is a still further another object of the present invention to provide a molded-in advertising panel in which advertising is visible even when carts are nested, and in which the company logo is not obscured.

It is a further object of the present invention to provide a molded-in advertising panel using snap in frame elements that are simple to maintain and replace, that permit easy handling of the advertisement, that use no hinges or other moving parts, and that are low maintenance and inexpensive.

The directed advertising panels of the present invention are to achieving these objects. In one embodiment, the advertising panel is retrofitted on an existing shopping cart basket. In this embodiment, the advertising panel may be retrofitted on either plastic cart baskets or wire cart baskets. The advertising panel includes two separate components namely, a frame element and a plate element. There are no moving parts and either of the two components may be separately removed or replaced as desired. The plate element is rectangular and has outer peripheral edge walls disposed around and protruding from the perimeter of the outwardly facing side. These edge walls have tab receiving slots which receive tabs disposed on the frame element. The edge walls strengthen the plate element and prevent the frame element from receiving impacts and damage. Three edge walls, the top, the bottom, and one side, are formed to shield the sides of the frame element. The remaining side serves as a receiving opening that permits insertion and removal of advertisements therethrough. This allows the top edge wall to prevent moisture from dripping down and contacting the advertisements. This preserves the condition and increases the life of the advertisements. The receiving opening side is formed as a stepped retaining lip. This lip permits easy insertion of the advertisement into the panel while preventing tampering with and loss of the advertisement. Advertisements are easily inserted into the advertising panel through the receiving opening without removing the frame element from the plate portion. The plate element is symmetric around a central horizontal axis. It may be disposed on a cart so that advertisements can enter from either the left or the right side.

The plate element is formed with oblong holes disposed in strategic locations. These holes preferably have a maximum width of 0.25 inch especially when panels are not mounted back to back. This dimensioning prevents objects greater than 0.25 inch in diameter from protruding therethrough and prevents children from poking at and damaging the advertisement. The oblong holes prevent warping and stress distortion during the injection molding process thereby allowing a flat plate element to be constructed. This allows the advertisement to easily slide in the panel and permits a superior, flatter display without excess reflection or bowing of the advertisement. These holes also increase the cleanliness of the panel by permitting water drainage. Also, in addition to the tab receiving slots, drainage holes are provided at the intersection of the plate element and the bottom edge wall.

The advertising panels are retrofitted on the front wall of the cart basket. Preferably, two advertising panels are used, one on the inside and one on the outside of the basket front wall. Two plate elements are disposed back-to-back with the front wall of the basket therebetween. The plate elements are screw fastened together through the front wall of the basket to secure the advertising panel to the basket. Holes are formed in projections in corresponding locations on the back of both plate elements. This permits the plate elements to more closely fit within the latticework of the front wall of the basket to better secure the advertising panels to the front wall. The frame element is rectangular, symmetrical around a central horizontal axis, and corresponds in size to the plate element. The frame element fits within the edge walls of the plate element and is secured to the plate element by complementary tabs which fit within the tab receiving slots of the edge walls of the plate element.

The molded-in advertising panel is similar in many respects to the improved retrofitted advertising panel of the present invention. The molded-in panel also uses two components, a frame element and a plate portion. The plate portion is integrally molded with the side walls of the plastic basket. The plate portion may be formed on both of the side walls in addition to the front wall. This embodiment also uses no moving parts and uses a frame element that is identical to that of the retrofitted device. The frame element is rectangular, has tabs, and is replaceable and removable from the shopping cart. Preferably, the molded-in plate portions are formed near the upper rear of the side walls to be visible when carts are nested and to provide adequate space for the company logo. The plate portion is recessed into the outer surface of the basket wall and flush with the inner surface of the basket wall. When the frame element is disposed against the plate portion, the frame element is likewise recessed from the outer surface of the basket wall. The tabs in the frame element fit within tab receiving slots formed within the latticework of the basket walls which forms the outer peripheral edge walls of the plate portion. The top edge wall prevents moisture from dripping down and contacting the advertisements. Drainage holes disposed in the bottom edge wall permit water to drain. The plate portion is also formed with oblong holes which perform the same functions as the oblong holes of the retrofitted advertising panel. Advertisements are inserted and removed through the side of the panel. A series of horizontal ribs is disposed along the length of this side opening. The horizontal ribs permit easy insertion of the advertisement into the panel while preventing tampering with and loss of the advertisement.

The molded-in advertising panels have many advantages over the retrofitted version. With the molded-in panels, advertising panels may be placed on the side walls of the cart basket in addition to the front wall; because the panel is molded into the basket walls and the frame element is recessed into the outside walls of the basket, carts may be nested together without damaging the panels. The cost of the molded-in advertising panel is much less than that for a retrofitted panel because the plate portion is part of the cart. Placing panels on the side walls of the basket doubles the advertising capacity of each cart. Additionally, the molded-in panels last several times longer than retrofitted panels. Advertisements may be inserted or removed from the advertising panels without removing the frame element. This reduces the time needed to change advertisements. This is significant as advertisements are typically changed every four weeks. Also, because the plate element is not removable, chances of it being damaged are decreased.

Various additional advantages and features of novelty which characterize the invention are further pointed out in the claims that follow. However for a better understanding of the invention and its advantages, reference should be made to the accompanying drawings and descriptive matter which illustrate and describe preferred embodiments of the invention.

BRIEF DESCRIPTION OF THE DRAWINGS

FIG. 19 is a sectional view of the advertising panel of FIG. 17 including the frame element taken along line 19—19.

FIG. 21 is a sectional view of the advertising panels of FIG. 20 taken along line 21—21.

DETAILED DESCRIPTION OF PREFERRED EMBODIMENTS

Figure 1:
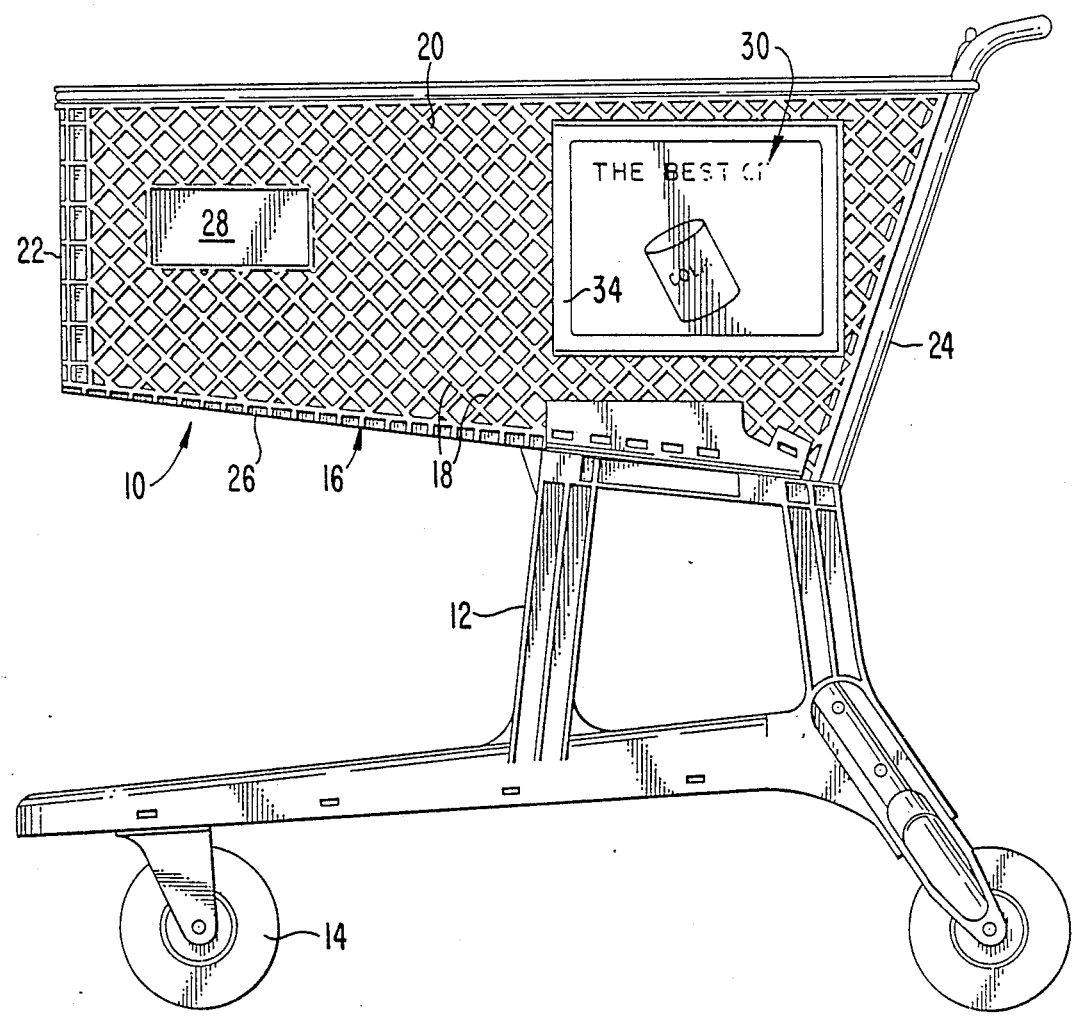
FIG. 1 is a side view of a scanner cart with molded-in advertising panels.
Figure 2:
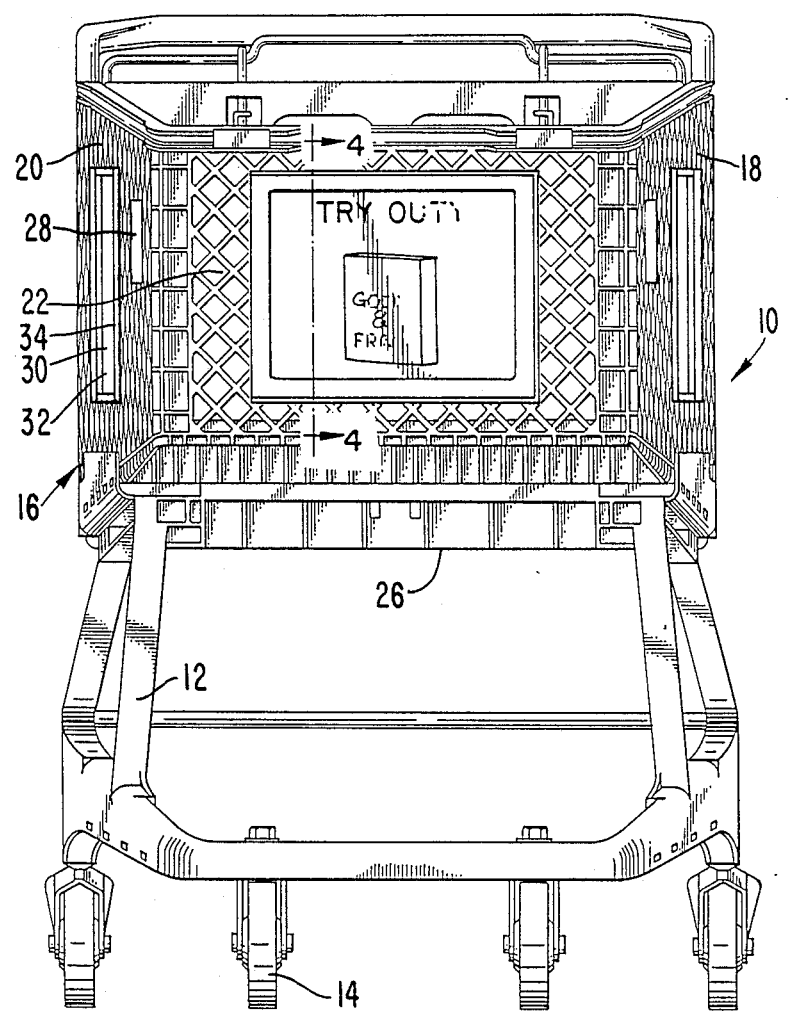
FIG. 2 is a front view of a scanner cart with retrofitted advertising panels mounted on the front wall and molded-in advertising panels on the side walls.

FIGS. 1 and 2 show a scanner type shopping cart having both retrofitted and molded-in advertising panels. Shopping cart 10 has metal cart frame 12 on which wheels 14 are mounted. Plastic basket 16 is mounted on frame 12. Plastic basket 16 may be formed of latticework 18 having any known pattern such as square or diamond. The basket may alternatively be a conventional wire mesh basket. Plastic basket 16 includes two side walls 20, front wall 22, back wall 24 and bottom surface 26. Logo space 28 is formed on one or both side walls 20.

Figure 3:
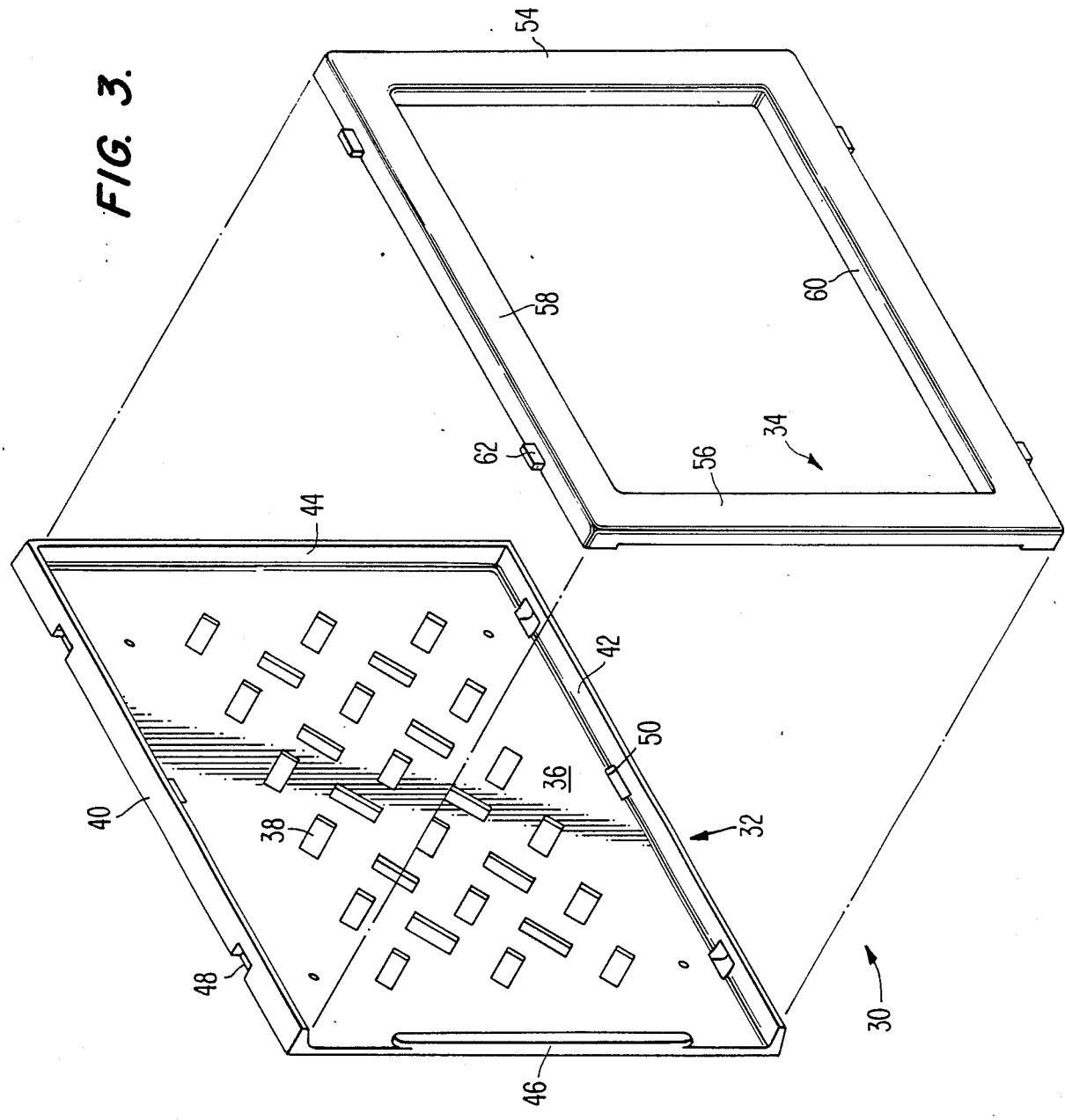
FIG. 3 is an exploded perspective view of the retrofitted advertising panel.
Figure 4:
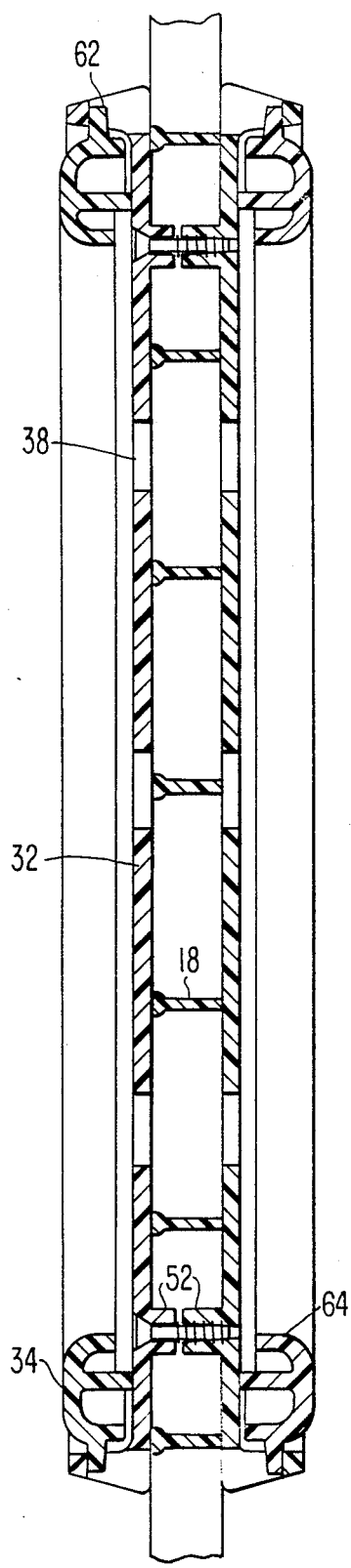
FIG. 4 is a sectional view of the retrofitted advertising panels of FIG. 2 taken along line 4—4.
Figure 5:
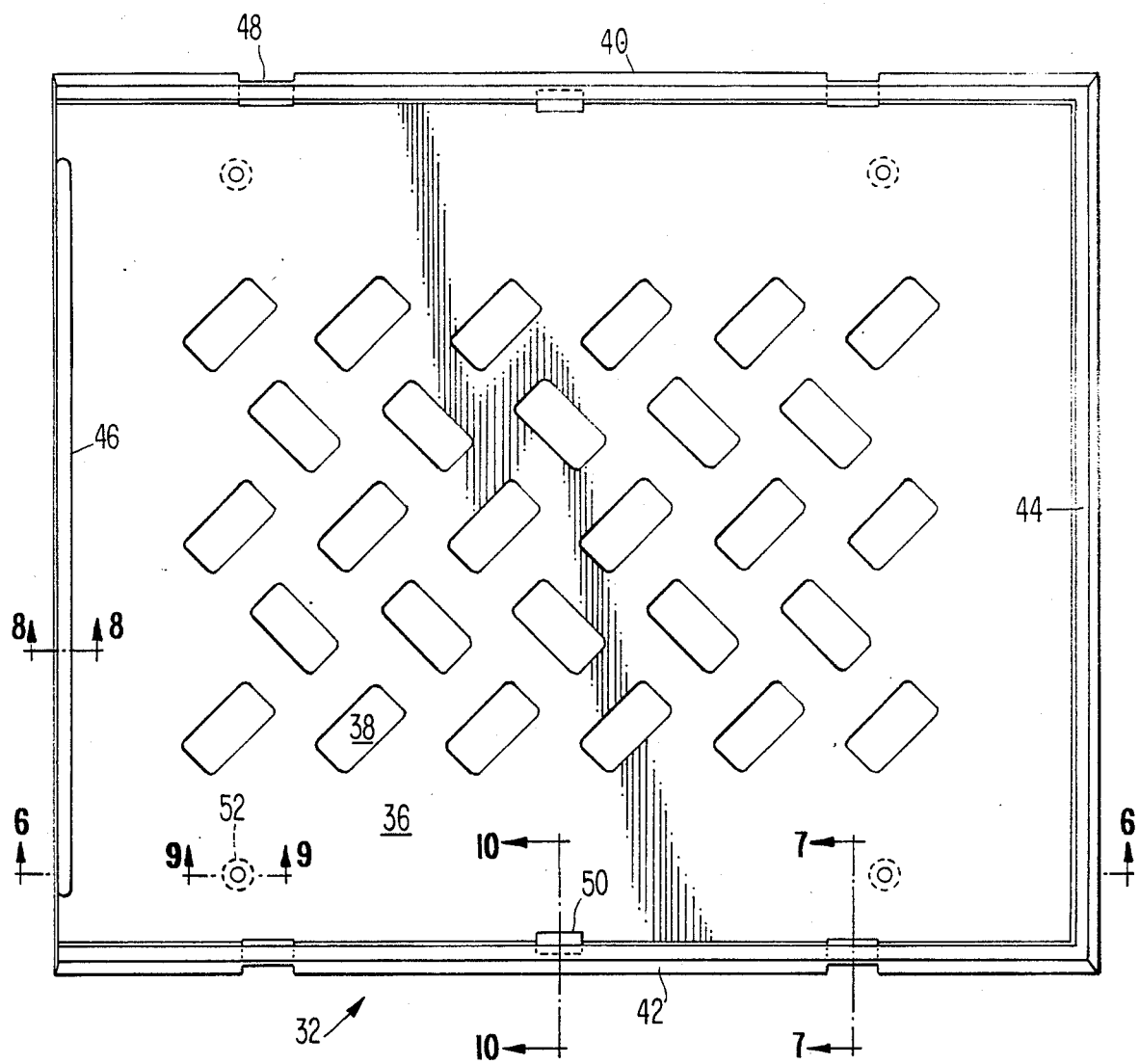
FIG. 5 is a front view of the plate element of the retrofitted advertising panel of FIG. 3.
Figure 6:
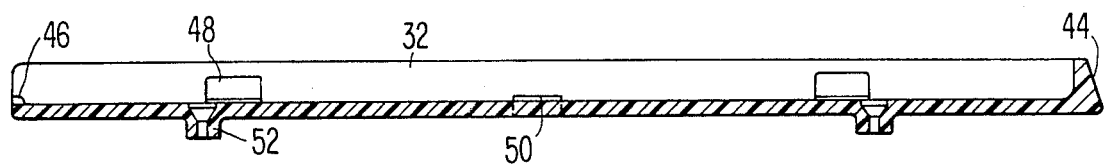
FIG. 6 is a sectional view of the plate element of FIG. 5 taken along line 6—6.
Figure 7:
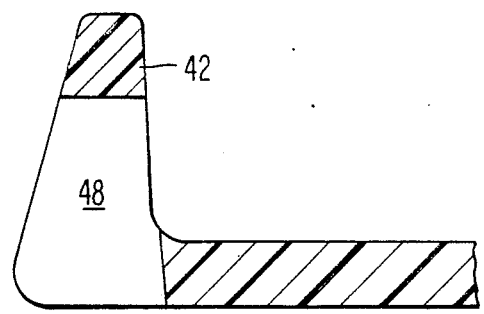
FIG. 7 is a sectional view of the plate element of FIG. 5 taken along line 7—7.
Figure 8:
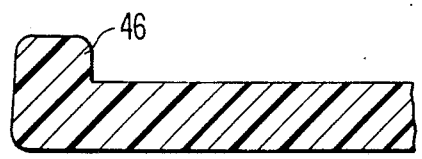
FIG. 8 is a sectional view of the plate element of FIG. 5 taken along line 8—8.
Figure 9:
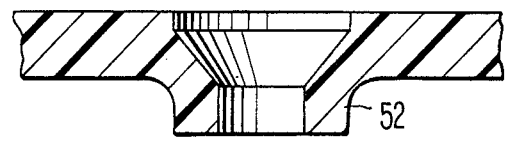
FIG. 9 is a sectional view of the plate element of FIG. 5 taken along line 9—9.
Figure 10:
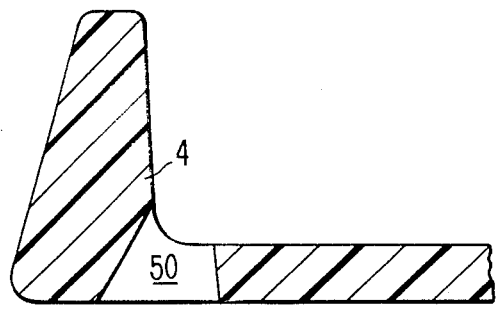
FIG. 10 is a sectional view of the plate element of FIG. 5 taken along line 10—10.
Figure 11:
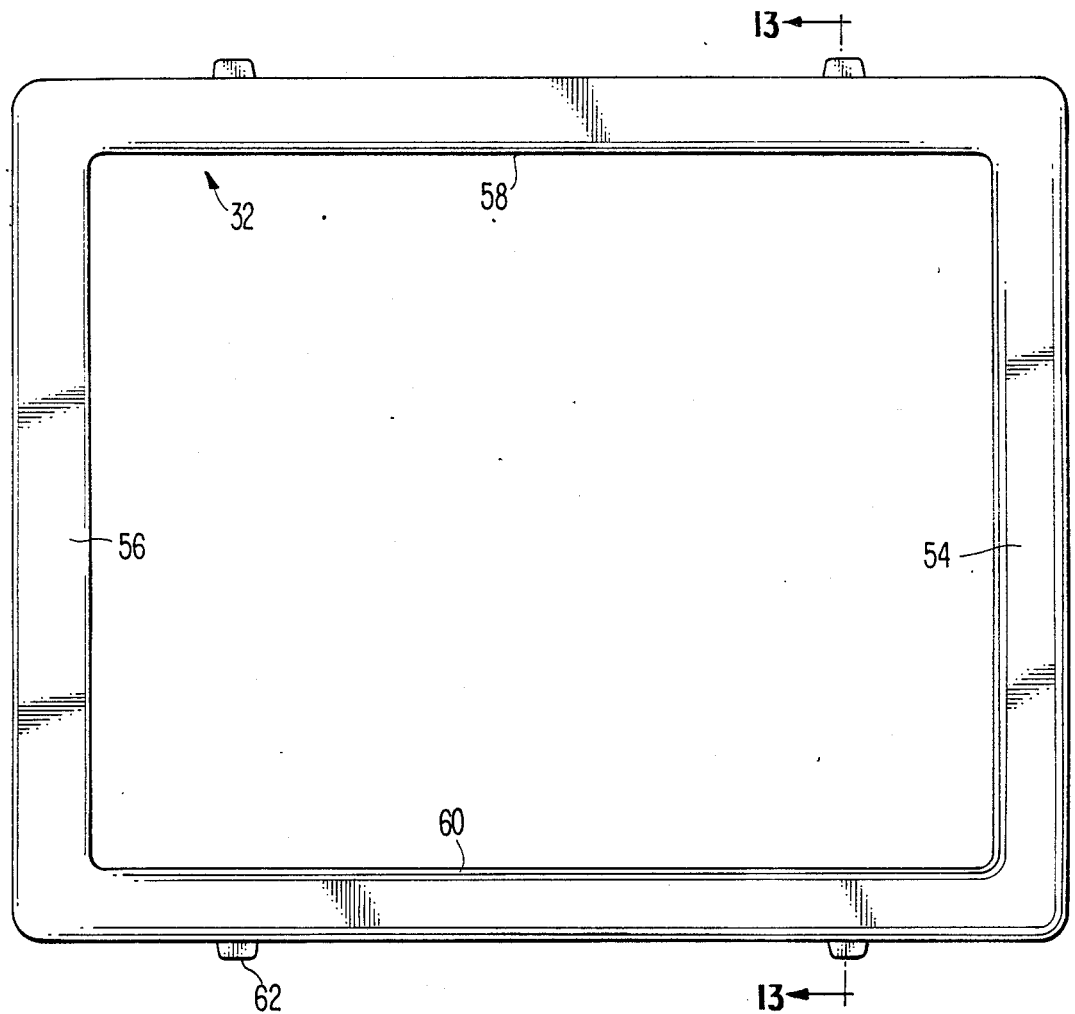
FIG. 11 is a front view of the frame element of the retrofitted advertising panel of FIG. 3.
Figure 12:
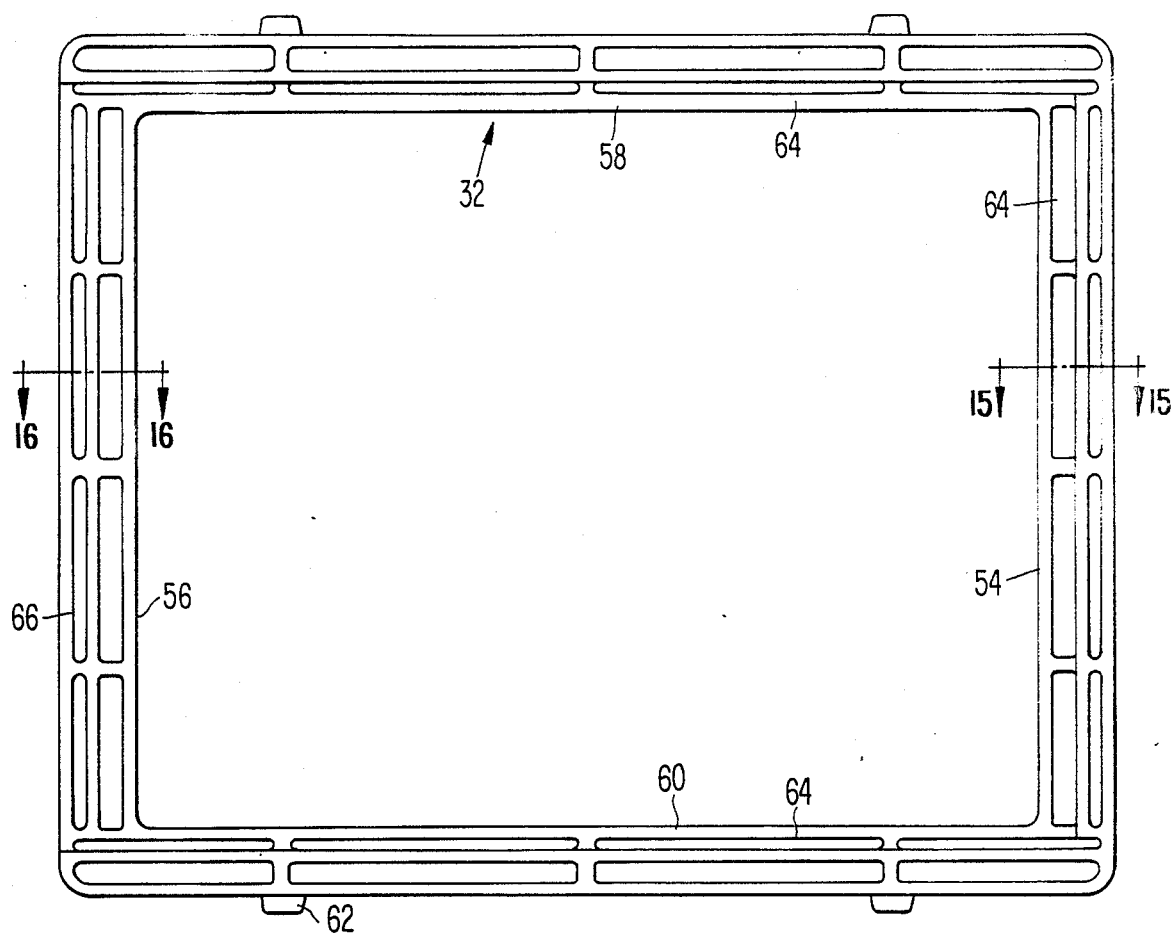
FIG. 12 is a rear view of the frame element of FIG. 11.
Figure 13:
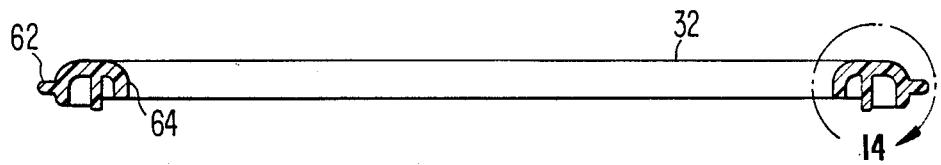
FIG. 13 is a sectional view of the frame element of FIG. 11 taken along line 13—13.
Figure 14:
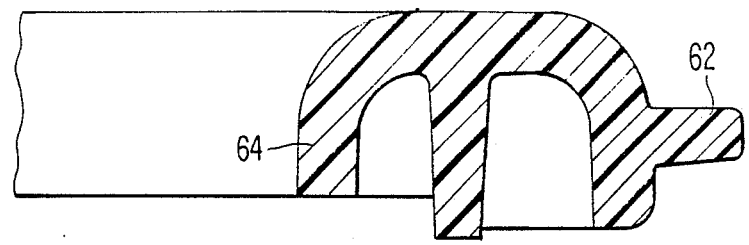
FIG. 14 is an enlarged view of the frame element of FIG. 13 taken around circle 14.
Figure 15:
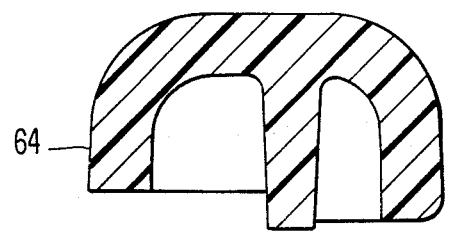
FIG. 15 is a sectional view of the frame element of FIG. 12 taken along line 15—15.
Figure 16:
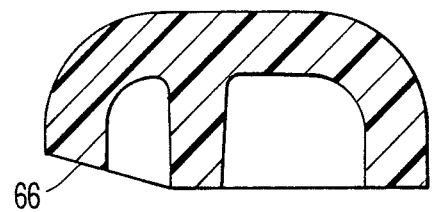
FIG. 16 is a sectional view of the frame element of FIG. 12 taken along line 16—16.
Figure 17:
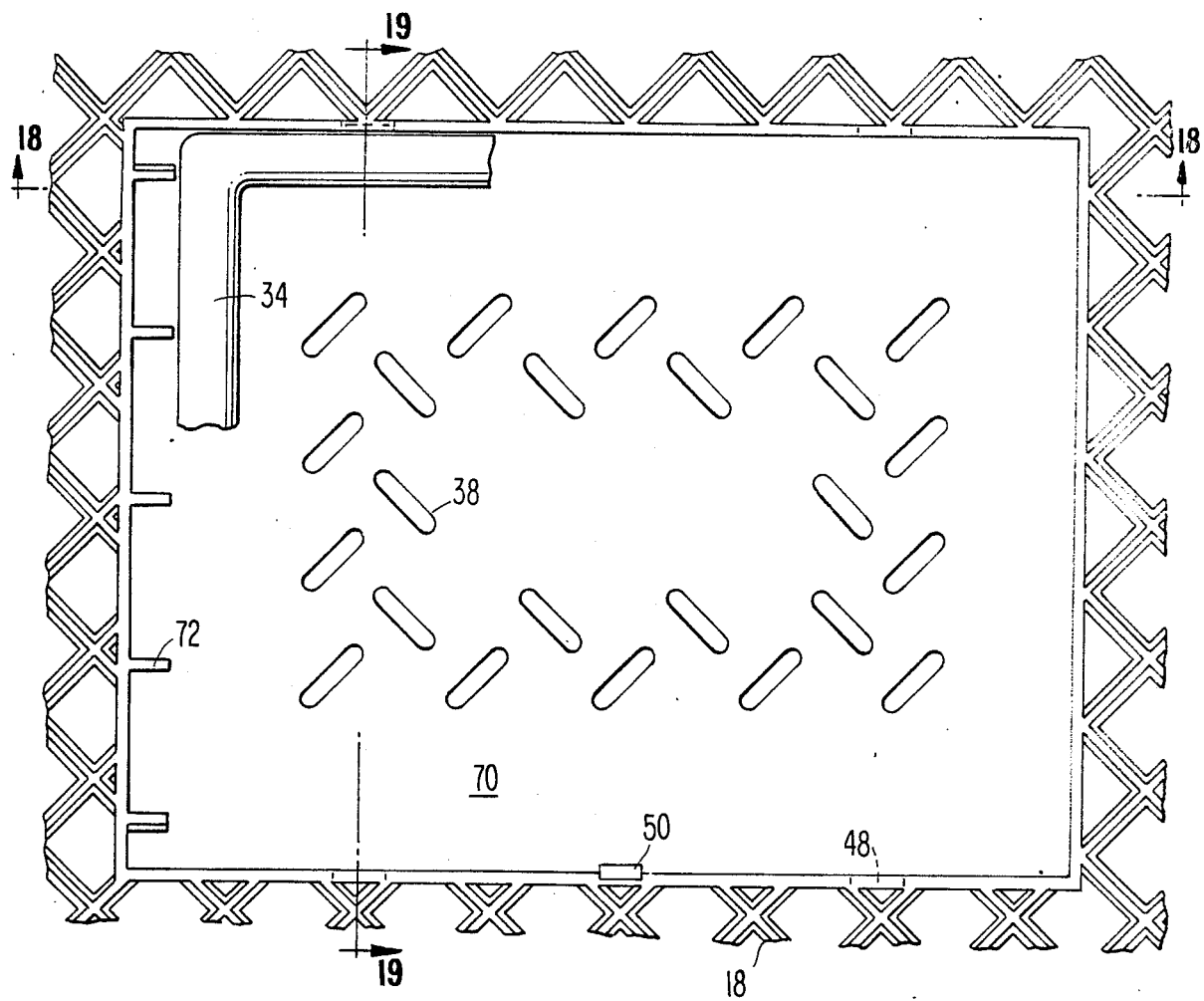
FIG. 17 is a front view of a molded-in advertising panel showing the plate portion and a partial view of the frame element.
Figure 18:
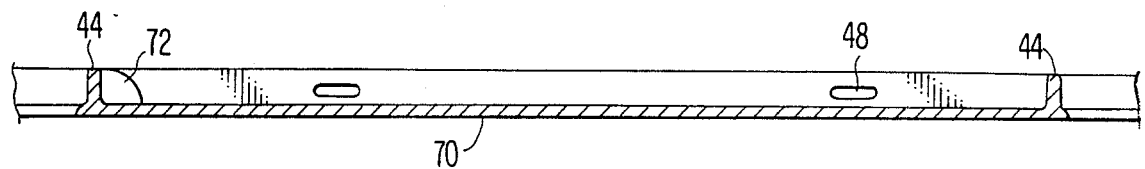
FIG. 18 is a sectional view of the plate portion of FIG. 17 taken along line 18—18.

Retrofitted advertising panel 30 is shown mounted on front wall 22 of basket 16 of shopping cart 10 in FIGS. 2 and 4. Although shown on a plastic scanner shopping cart basket in FIG. 2, retrofitted advertising panels 30 may be mounted on regular, jumbo, mini, and over-the-counter plastic shopping carts also. Additionally, retrofitted advertising panels 30 may be mounted on almost any wire shopping cart basket. Retrofitted advertising panel 30 includes two separate components: plate element 32 and frame element 34, as best shown in FIG. 3. Plate element 32, illustrated in detail in FIGS. 5-10, includes rectangular plate 36 made of polyethelene. Plate 36 is formed with a series of apertures such as oblong holes 38 therethrough. In practice, holes 38 need not be oblong nor disposed in any particular pattern. They also need not cover the entire central region of plate 36. Holes 38 are formed to prevent warping and stress distortion of plate element 32 during the cooling phase of the molding process. Holes 38 are formed preferably in the central portion of plate element 32 and are located so that there are no extended continuous areas of uninterrupted plastic. Holes 38 may be arranged so that most line segments taken from one side of plate 36 to another side and passing through the central region of plate 36 intersect at least one hole 38.

Plate element 32 is formed with edge walls extending around the perimeter and projecting outwardly from the front of plate 36. Top edge wall 40, bottom edge wall 42, and side edge wall 44 are disposed along the entire length of three edges of plate 36. Edge walls 40, 42, 44 are formed with a fine degrees taper. This assists in the removal of plate element 32 from the mold during molding and creates a more streamlined, integral look for the advertising panel. Edge walls 40, 42, 44 surround frame element 34 along three sides. The edge walls strengthen plate element 32 and shield the sides of frame element 34. Top edge wall 40 greatly reduces the possibility of moisture dripping onto and damaging the advertisement. The remaining side of plate element 32 serves as the advertisement receiving opening. Advertisements are inserted and removed from advertising panel 30 through this side. Stepped retaining lip 46 is disposed along the majority of this side of plate 36.

Two tab receiving openings 48 are formed in each of top and bottom edge walls 40, 42 and hold frame element 34 in place on plate element 32. Tab receiving openings are formed totally through top and bottom edge walls 40, 42. Additionally, a centrally located drainage hole 50 is disposed along both the top and bottom edges of plate 36. Drainage holes 50 are formed through only the edge of the plate 36 at the intersection of edge walls 40, 42. Drainage holes 50 do not extend through and do not provide vertical openings through edge walls 40, 42. Drainage holes 50 permit moisture that enters advertising panel 30 to drain out of the panel. The placement of drainage hole 50 adjacent top edge wall 40 renders plate element 32 symmetrical around its central horizontal axis. Thus, plate element 32 may be used with the advertising receiving opening on its right or left side. If symmetry is not required, then drainage hole 50 disposed adjacent top edge wall 40 need not be formed.

Hollow mounting projections 52 are formed on the back surface of plate element 32 and receive self-tapping screws which secure advertising panels 30 to front wall 22 of shopping cart 10. In practice, two advertising panels 30 are disposed on front wall 22. One panel is disposed in the outside and the other on the inside of front wall 22. Thus, the back surface of plate elements 32 abut each other through front wall 22 and mounting projections 52 on each plate element 32 abut each other. Screws are threaded from one plate element 32, through front wall 22, and into the other plate element 32.

Frame element 34, illustrated in detail in FIGS. 11-16, includes first and second side members 54, 56, top member 58, and bottom member 60. Frame element 34 is symmetrical around a central horizontal axis. Tabs 62 are disposed on the side of top and bottom members 58, 60 at locations corresponding to tab receiving openings 48 of plate element 32. Tabs 62 removably fit into tab receiving openings 48 to secure frame element 34 to plate element 32. Frame element 34 fits within edge walls 40, 42, 44. The undersides of top member 58, bottom member 60 and first side member 54 are formed with shortened inside portions 64 to receive advertisements thereunder. This secures the advertisements in advertising panel 30. The depth of second side member 56 is less than that of top, bottom, and first side members 58, 60, 54. The outside portion of the underside of second side member 56 is sloped or tapered upwardly in a direction extending outwardly. This sloped surface 66 facilitates insertion and removal of advertisements between plate element 32 and frame element 34. Thus, frame element 34 need not be removed or dislodged from plate element 32 to insert or remove advertisements.

Figure 20:
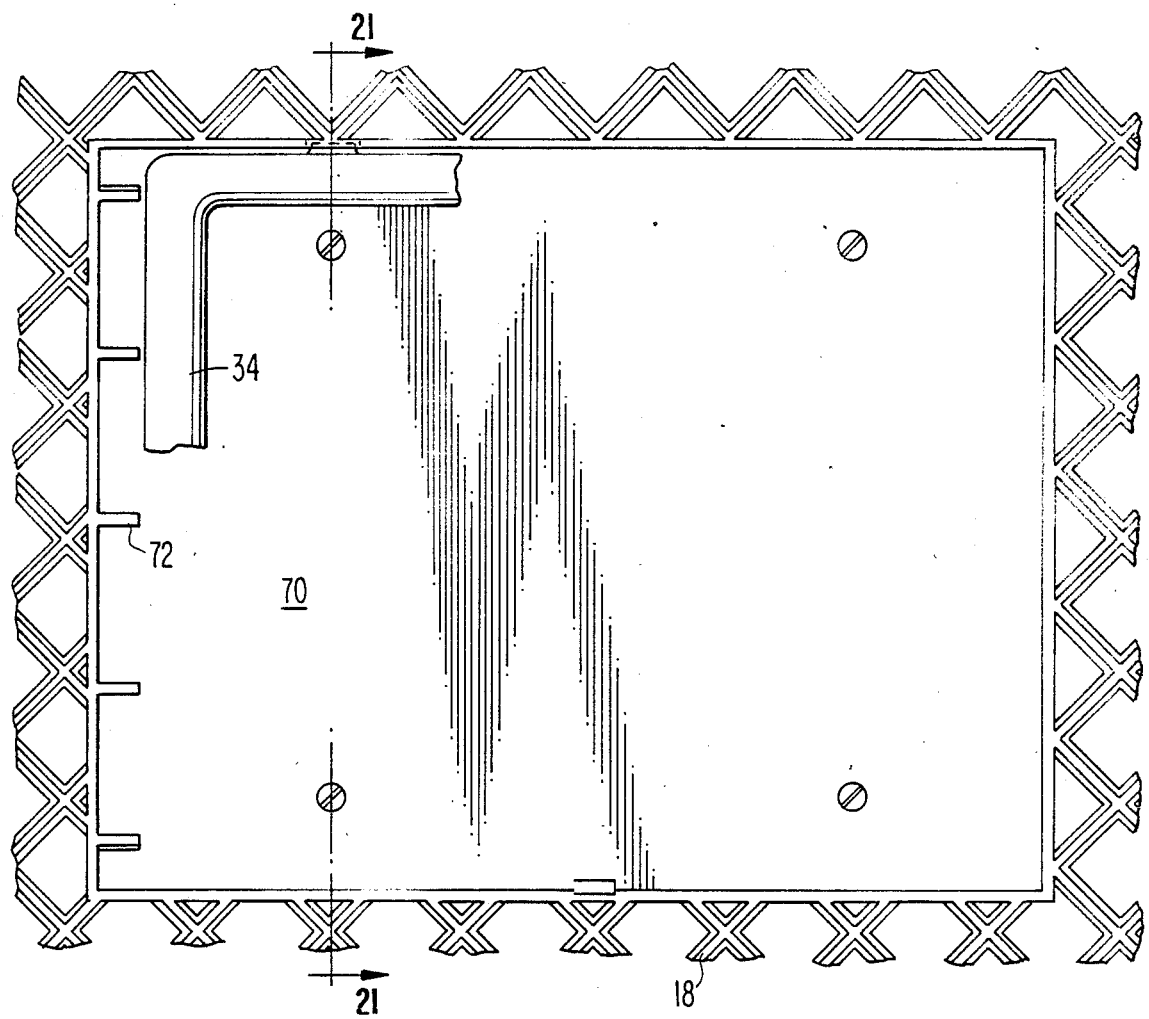
FIG. 20 is a front view of a molded-in advertising panel with a retrofitted advertising panel mounted thereon.
Figure 22:
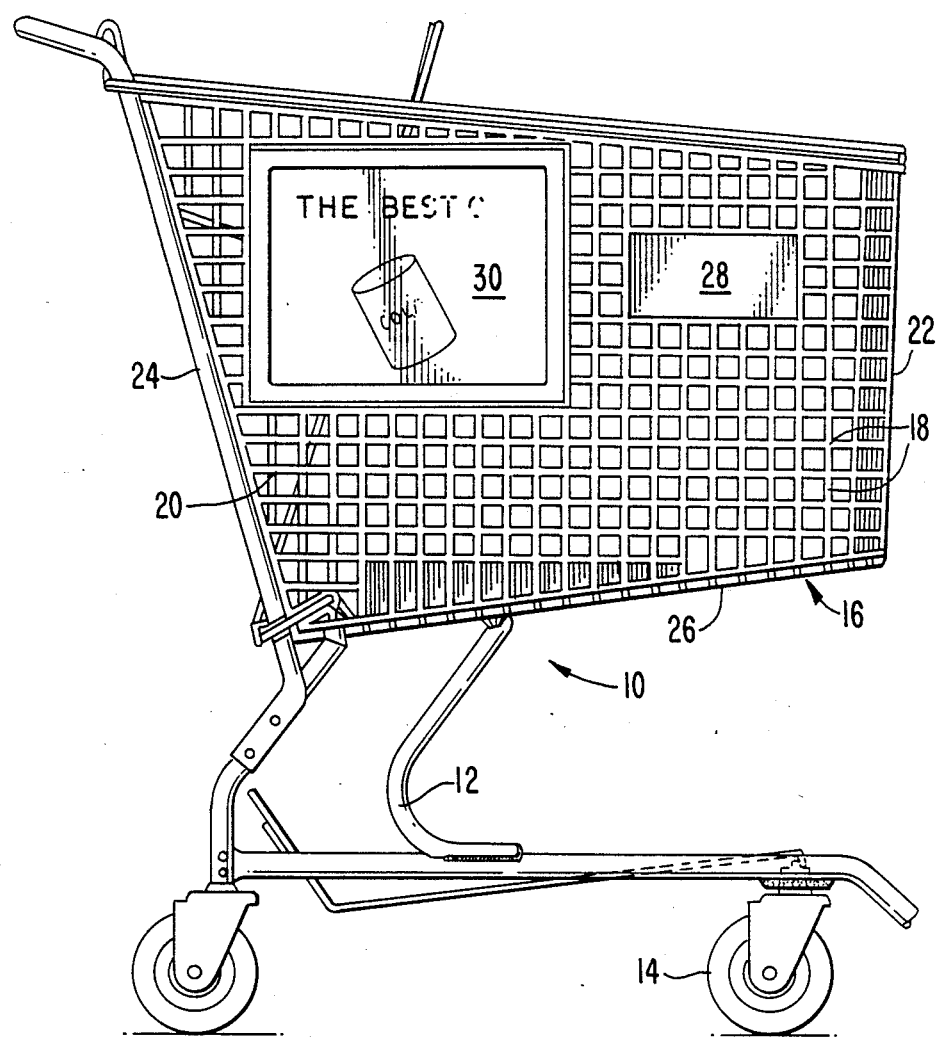
FIG. 22 is a side view of a conventional cart with molded-in advertising panels of the present invention.
Figure 23:
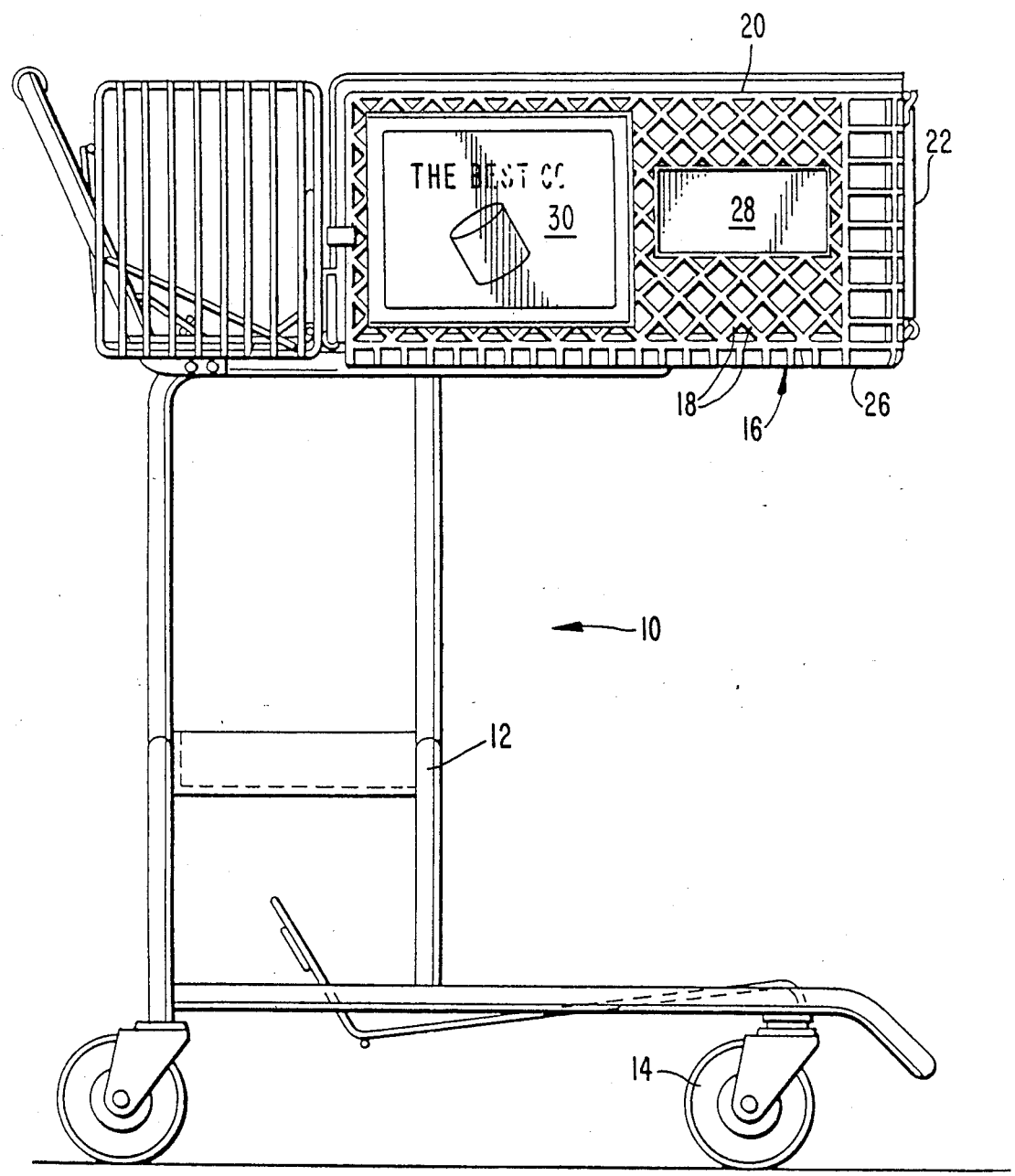
FIG. 23 is a side view of an over-the-counter cart with molded-in advertising panels.

FIGS. 1 and 2, 22, and 23 illustrate scanner, regular, and over-the-counter shopping carts, respectively, having molded-in advertising panels 30. Molded-in advertising panels 30 are formed not only on the exterior of front wall 22 of shopping carts 10, but also on both side walls 20. Additionally, a retrofitted advertising panel 30 may be fastened to the inside of front wall 22, as shown in FIGS. 20 and 21. In FIGS. 20 and 21, oblong holes 38 are omitted for clarity. When mounting a retrofitted advertising panel on to a molded-in advertising panel, mounting projections are not necessary.

Alternately, molded-in advertising panel 30 may be formed on the inside of front wall 22 and retrofitted advertising panel 30 fastened to the outside of front wall 22, or molded-in advertising panels 30 may be formed on both sides of front wall 22. Frame element 34 used with molded-in advertising panel 30 is identical to frame element 34 used with retrofitted advertising panel 30. Plate portion 70 performs identical functions to plate element 32 of the retrofitted advertising panel but, because it is molded and formed as part of the walls of basket 16, it has different features.

Plate portion 70, shown in detail in FIGS. 17-21, is integrally formed with walls 20, 22 of plastic basket 16. (For this discussion, it is assumed that plate portion 70 is formed to display advertisements on the outside of front wall 22 only.) The rear or inwardly facing surface of plate portion 70 is formed flush with the inner surface of walls 20, 22. The front or outwardly facing surface of plate portion 70 is recessed from the outer surface of walls 20, 22. When frame element 34 is positioned on plate portion 70, it too is recessed from the outer surface of walls 20, 22. Plate portion 70 is formed on the upper rear portion of side walls 20 and logo space 28 is formed toward the front of side walls 20. This permits advertisements within advertising panel 30 to be visible even when shopping carts 10 are nested. Plate portion 70 is also formed with a series of apertures such as oblong holes 38. Because, regarding at least advertising panels 30 molded in side walls 20, oblong holes 38 will be exposed to the interior of basket 16, oblong holes 38 are formed preferably with a maximum width of only 0.25 inches. This minimizes the number of objects that can extend through oblong holes 38 to damage the advertisement. It also prevents children from poking fingers in through the holes and tampering with the advertisement. The top, bottom, and side edge walls 40, 42, 44 for plate portion 70 are formed by latticework 18 adjacent and surrounding plate portion 70. Tab receiving openings 48 are formed in appropriate locations in top and bottom edge walls 40, 42. A central drainage hole 50 is formed in bottom edge wall 42 only. Although edge walls are formed around the entire perimeter of molded-in advertising panel 30, additional horizontal ribs 72 are formed on plate portion 70 adjacent the side of plate portion 70 that serves as the advertisement receiving opening.

Numerous characteristics, advantages, and embodiments of the invention have been described in detail in the foregoing description with reference to the accompanying drawings. However, the disclosure is illustrative only and the invention is not limited to the precise illustrated embodiments. Various changes and modifications may be effected therein by one skilled in the art without departing from the scope or spirit of the invention.

I claim:

1. A shopping cart comprising:
   a plastic first wall;
   a plastic second wall connected to said first wall, said second wall having a second wall inner surface, a second wall outer surface, and a second wall opening, said second wall and said first wall defining in part a shopping cart basket;
   a plate member disposed in said second wall opening and integrally formed and molded as one piece with said second wall, said plate member having an inner side and an outer side;
   a frame member releasably mountable on said plate member and thereby generally recessed in from said second wall outer surface; and
   a releasable holding means for releasably holding said frame member on said plate member;
   wherein said frame and plate members, when held together by said releasable holding means, define generally therebetween an advertisement card receiving slot and an advertisement card display area, the advertisement card display area being positioned for receiving therein into an advertisement card display position an advertisement card inserted through said advertisement card slot when said frame and plate members are held together by said releasable holding means.

2. The shopping cart of claim 1 wherein said inner side is flush with said second wall inner surface.

3. The shopping cart of claim 1 wherein said plate and frame members are both rectangularly shaped, and said frame member has dimensions thereof corresponding to dimensions of said plate member.

4. The shopping cart of claim 1 wherein said frame member has its outer surface recessed in a distance from said second wall outer surface when said frame member is mounted on said plate member.

5. The shopping cart of claim 1 wherein said shopping cart basket is nestable in a nesting position in a similar shopping cart.

6. The shopping cart of claim 5 wherein said second wall comprises a side wall having an upper rear portion, and said plate member is formed in said upper rear portion so that the advertisement card display area is not obstructed when said shopping cart basket is in the nesting position.

7. The shopping cart of claim 5 wherein said plate member is fixed to said second wall when said shopping cart basket is in the nesting position and when not in the nesting position is in the same relative fixed relation.

8. The shopping cart of claim 5 wherein said second wall comprises a side wall, and said first wall comprises a front wall, and further comprising a logo panel attached to said side wall.

9. The shopping cart of claim 8 wherein said logo panel is integrally formed and molded as one piece with said side wall.

10. The shopping cart of claim 8 wherein said logo panel is not obscured from outside of said shopping cart basket when said shopping cart basket is in the nesting position.

11. The shopping cart of claim 5 wherein said frame member has an inner frame surface and an outer frame surface, said inner frame surface when said plate and frame members are mounted together being recessed in from said side wall outer surface.

12. The shopping cart of claim 1 wherein said advertisement card display area is rectangularly shaped and has a pair of display side portions, a top portion and a bottom portion, the side, top and bottom portions defining four edge portions, and said advertisement card receiving slot being positioned at one said edge portions.

13. The shopping cart of claim 1 further comprising a wheeled cart frame to which said shopping cart basket is mounted.

14. The shopping cart of claim 1 wherein said first wall defines a front wall, said second wall defines a first side wall, and further comprising a second side wall, a back wall, and a bottom wall, said shopping cart basket being defined by said first and second side walls, said front wall, said back wall, and said bottom wall.

15. The shopping cart of claim 1 wherein said plate member is formed of a molded plastic and includes a plurality of spaced apertures therethrough to prevent warping and stressing of said molded plastic plate member during cooling formation thereof.

16. The shopping cart of claim 15 wherein said apertures are oblong-shaped, are exposed to the interior of said shopping cart basket and have a maximum width of not more than one-quarter inch.

17. The shopping cart of claim 1 wherein said second wall includes a plastic latticework, and said plate member includes at least one outwardly disposed edge wall formed by portions of said plastic latticework surrounding and adjacent said plate member.

18. The shopping cart of claim 17 wherein said edge wall comprise a bottom edge wall.

19. The shopping cart of claim 18 wherein said bottom edge wall includes a drainage hole therethrough.

20. The shopping cart of claim 17 wherein said edge wall comprises a top wall.

21. The shopping cart of claim 17 wherein said edge wall comprises a side wall.

22. The shopping cart of claim 17 wherein said edge wall comprises a top wall.

23. The shopping cart of claim 1 further comprising outwardly disposed edge walls about the perimeter of said plate member.

24. The shopping cart of claim 23 wherein said releasable holding means is partially formed in said edge walls.

25. The shopping cart of claim 23 wherein said releasable holding means comprises tab receiving openings formed by said edge walls and tabs secured to said frame member and insertable into said tab receiving openings.

26. The shopping cart of claim 23 further comprising said edge walls including a bottom edge wall, said bottom edge wall defining a drainage hole disposed therethrough.

27. The shopping cart of claim 1 further comprising at least one rib forming a portion of said advertisement card slot.

28. The shopping cart of claim 27 wherein said at least one rib comprises a plurality of horizontally disposed ribs.

29. The shopping cart of claim 27 further comprising said rib being formed on said plate member.

30. The shopping cart of claim 1 wherein said releasable holding means comprises a tab-and-opening holding mechanism.

31. The shopping cart of claim 1 wherein said plate element includes edge walls, and said retaining means comprises a plurality of tabs disposed on outer edges of said frame member and a plurality of openings disposed in corresponding locations on said plate edge walls, said tabs engaging in said openings when said frame member is mounted on said plate member.

32. The shopping cart of claim 1 wherein said frame member is rectangularly shaped and is symmetrical about a central horizontal axis thereof.

33. The shopping cart of claim 1 further comprising an additional advertising panel mounted on said second wall inner surface.

34. The shopping cart of claim 1 wherein said frame member includes a first side wall, a top wall, and a bottom wall, and the advertisement card slot is defined by a side of said frame member opposite to said side wall.

35. The shopping cart of claim 1 wherein said frame member is symmetrical about a horizontal axis thereof and thus can be reoriented to define the location of the advertisement card slot as being at either a forward or a rearward end of said plate member.

36. A shopping cart wall comprising:
a wall having a wall inner surface, a wall outer surface and a wall opening;
a plate member secured in said wall opening, said plate member having inner and outer sides; and
a frame member attached to said plate member and recessed in from said wall outer surface;
wherein said plate and frame members define generally therebetween an advertisement card receiving slot and an advertisement card display area associated with said slot such that an advertisement card can be inserted in through said slot to said area and to a display position generally within said frame member and subsequently removed from said area through said slot.

37. The shopping cart wall of claim 36 wherein said wall is made of plastic.

38. The shopping cart wall of claim 37 wherein said plate member is integrally formed and molded as one piece with said wall.

39. The shopping cart wall of claim 36 wherein said frame member is releasably held on said plate member.

40. The shopping cart wall of claim 36 wherein said inner side is flush with said wall inner surface.

41. The shopping cart wall of claim 36 further comprising a logo panel mounted on said wall.

42. The shopping cart wall of claim 36 wherein said wall includes a plastic latticework, and said plate member includes at least one outwardly disposed edge wall formed by portions of said plastic latticework surrounding and adjacent said plate member.

43. The shopping cart wall of claim 36 wherein said plate member includes an elongated retaining lip at said slot and positioned to prevent an advertisement card from freely sliding out of said area through said slot.

44. The shopping cart wall of claim 36 wherein said plate member is formed having a plurality of oblong apertures, said oblong apertures preventing warping and reducing stress distortion during the molding of said plate member.

45. The shopping cart wall of claim 36 wherein said plate member is formed of a molded plastic and includes a plurality of spaced apertures therethrough to prevent warping and stressing during cooling formation thereof.

46. The shopping cart wall of claim 45 wherein said apertures comprise a plurality of rows of oblong holes.

47. The shopping cart wall of claim 45 wherein said apertures are oblong and have a maximum width of one-quarter inch.

48. The shopping cart wall of claim 47 wherein said oblong apertures are located on said plate member so that any line segment connecting any two sides of said plate member and passing through a central portion of said plate member passes through at least one said oblong aperture.

* * * * *